Jan. 1, 1929.
E. E. ROSE
1,697,143
ARC CHUTE
Filed Feb. 1, 1927
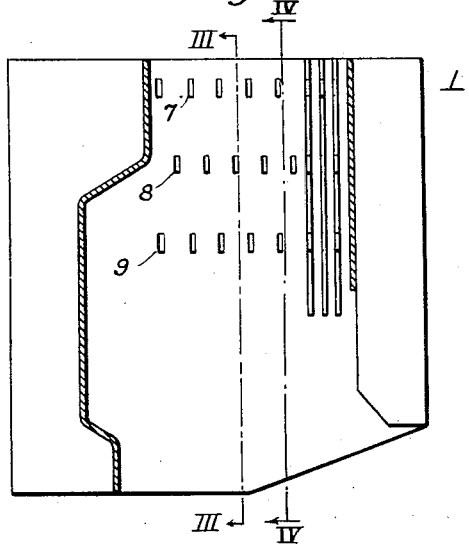
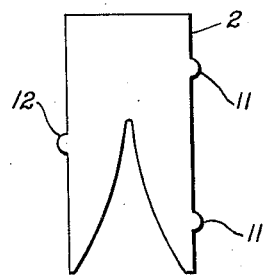
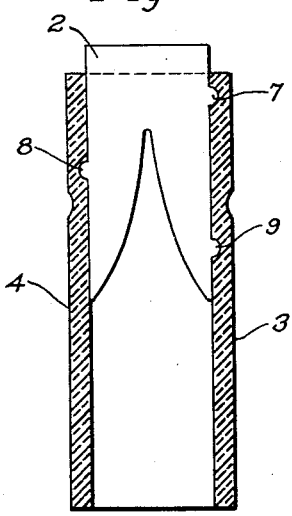
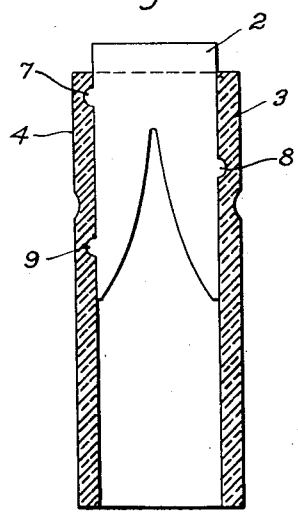
WITNESSES:
C. J. Weller.
P. F. Seibold
INVENTOR
Edward E. Rose.
BY
Wesley G. Carr
ATTORNEY Patented Jan. 1, 1929.

1,697,143

UNITED STATES PATENT OFFICE.

EDWARD E. ROSE, OF EDGEWOOD, PENNSYLVANIA, ASSIGNOR TO WESTINGHOUSE ELECTRIC & MANUFACTURING COMPANY, A CORPORATION OF PENNSYLVANIA.

ARC CHUTE.

Application filed February 1, 1927. Serial No. 165,233.

My invention relates to arc chutes and especially to molded arc chutes for deion circuit interrupters.

One object of my invention is to provide a molded arc chute that shall have grid-supporting recesses molded within the sides thereof.

A further object of my invention is to provide a circuit interrupter having recesses that will support conducting members in close proximity to each other.

Heretofore, in supporting the arcing grids in deion circuit interrupters, difficulty has been encountered in securing a molded material of sufficient strength to maintain the shape of the narrow ribs required between adjacent grids.

I propose, by the use of slotted recesses in staggered relation to each other, to so increase the strength of the material remaining between the adjacent recesses that the arc chute grids may be supported in close proximity to each other.

In the accompanying drawings,

Fig. 1 is a sectional view of an arc-chute embodying my invention.

Fig. 2 is a face view of a conducting grid element, and

Figs. 3 and 4 are sectional views of the arc-chute taken along the section lines III—III and IV—IV of Fig. 1, respectively.

My invention comprises, in general, an arc chute 1 of molded material, in which is disposed a plurality of deionizing grids 2 by means of an arrangement of projections and slots hereinafter more fully described.

The arc chute 1 is constituted by a pair of supplementary sections 3 and 4 of insulating material, in the inner faces of which are disposed a plurality of series of recesses 7, 8 and 9. The individual recesses of the series 7, 8 and 9 in the sections 3 and 4 are disposed along the horizontal axis of the arc chute 1 at distances equal to the space required between adjacent deionizing grids 2. One of the recesses of the series 7, 8 and/or 9 in either of the members 3 or 4, is directly opposite to the mid-point between a pair of the recesses 7, 8 and/or 9 in the other portion of the arc chute 1. Accordingly, the space between any two adjacent recesses in any of the series 7, 8 or 9 is equal to twice the spacing distance between adjacent deionizing grids 2.

The foregoing arrangement enables the manufacturer to secure a greater depth of insulating material between adjacent grids 2 than is possible where each deionizing grid 2 engages a recess in each of the series of recesses 7, 8 or 9 on both of the sections 3 and 4.

Referring to Figs. 2, 3 and 4, each of the deionizing grids 2 has a pair of projections 11 disposed on one edge, and a single projection 12 disposed on the other edge. The distance between the projections 11 is equal to the distance between the series of recesses 7 and 9 in the arc chute sections 3 and 4, while the projection 12 is so disposed on a line midway between the projections 11 that it is in alignment with the series of recesses 8.

In the assembly of the arc chute 1 embodying my invention, the grids 2 are placed in one of the sections 3 or 4 in reverse order, that is, with the first grid unit having its projection 11 engaging aligned recesses in a series 7 and 9 in one of the sections 3 and 4; the second grid unit has its single projection 12 engaging a single recess in the series 8; the third grid unit engages a pair of aligned projections in the series 7 and 9, and the fourth grid unit engages a single recess in the series 8.

The foregoing relation is illustrated by comparing Figs. 3 and 4, where a pair of adjacent grids 2 are shown with their connection to the arc chute sections 3 and 4. Accordingly, an amount of material, the length of which is twice the distance between adjacent grids 2, is interposed between the points of bearing of the grid members 2 in any series of recesses 7, 8 and 9 in either of the sections 3 or 4. The supplementary section of the arc chute is then placed above the grids 2 and secured thereto in any desired manner.

Accordingly, I have provided an arc chute of molded material for supporting deionizing grids in which the amount of material between the points of support of the several grid members is materially increased without interfering with the most advantageous disposition of the grid elements in accordance with the desired electrical conditions.

While I have shown and described a particular form of my invention, changes may be effected therein without departing from the spirit and scope thereof, as set forth in the appended claims.

I claim as my invention:

1. In an arc chute, a pair of opposite walls of insulating material, grid members disposed therein and having such supporting engagement with the side walls in a plurality of planes that the points of engagement between adjacent grid members in the side walls are in staggered relation.

2. In an arc chute, a pair of opposing walls of insulating material, a plurality of horizontally and vertically alined groups of supporting means formed therein and a grid member having unsymmetrically alined supporting members formed along its edges for co-operation with the supporting means in the insulating walls, whereby the supporting means on the walls and on the grid members co-operate only at staggered points in the several horizontally disposed groups.

3. In an arc chute, a pair of opposing walls of insulating material, a plurality of horizontally and vertically alined groups of supporting means formed therein and a grid member having unsymmetrically alined supporting members formed along its edges for co-operation with the supporting means in the insulating walls, whereby the supporting means on the walls and on the grid members co-operate only at staggered vertical points along the opposite walls.

4. In an arc chute, a pair of opposing walls of insulating material, a plurality of horizontally and vertically alined groups of supporting means formed therein and a grid member having two projections formed along one edge and a single projection formed on an opposing edge in staggered relation to the first-named projection, whereby the supporting means and the projections co-operate only at staggered points in the several horizontally disposed groups.

5. In an arc chute, a pair of opposing walls of insulating material, a plurality of horizontally and vertically alined groups of supporting means formed therein and a grid member having two projections formed along one edge and a single projection formed on an opposing edge in staggered relation to the first-named projection, whereby the supporting means and the projections co-operate only at vertical points along the opposite walls.

In testimony whereof, I have hereunto subscribed my name this 26th day of January, 1927.

EDWARD E. ROSE.